US010445786B2

(12) United States Patent
Amit et al.

(10) Patent No.: US 10,445,786 B2
(45) Date of Patent: Oct. 15, 2019

(54) SPONSORED INTERFACES IN A SOCIAL NETWORKING SYSTEM

(71) Applicant: Facebook, Inc., Menlo Park, CA (US)

(72) Inventors: Alon Amit, Los Altos, CA (US);
Gregory Joseph Badros, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 1430 days.

(21) Appl. No.: 13/748,521

(22) Filed: Jan. 23, 2013

(65) Prior Publication Data
US 2014/0208234 A1    Jul. 24, 2014

(51) Int. Cl.
*G06F 3/048* (2013.01)
*G06Q 30/02* (2012.01)
*G06Q 50/00* (2012.01)

(52) U.S. Cl.
CPC ......... *G06Q 30/0273* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 8,527,333 B1 * | 9/2013 | Chatterjee | G06Q 30/0241 705/14.1 |
| 8,732,177 B1 * | 5/2014 | Chinnasamy | G06F 17/30867 707/749 |
| 2007/0038509 A1 * | 2/2007 | Jain | G06Q 30/02 705/14.48 |
| 2007/0061363 A1 * | 3/2007 | Ramer | G06Q 30/02 |
| 2007/0255754 A1 * | 11/2007 | Gheel | G06F 17/30876 |
| 2007/0288299 A1 * | 12/2007 | Rane et al. | 705/10 |
| 2010/0094878 A1 * | 4/2010 | Soroca et al. | 707/748 |
| 2011/0087658 A1 * | 4/2011 | Lunt et al. | 707/727 |
| 2011/0179453 A1 * | 7/2011 | Poniatowski | G06F 3/0482 725/58 |
| 2011/0258049 A1 * | 10/2011 | Ramer et al. | 705/14.66 |
| 2012/0036015 A1 * | 2/2012 | Sheikh | G06Q 30/02 705/14.54 |
| 2012/0110071 A1 | 5/2012 | Zhou et al. | |
| 2012/0130814 A1 * | 5/2012 | Hayes | 705/14.54 |
| 2012/0132701 A1 * | 5/2012 | Nakagawa | G06K 17/0022 235/375 |
| 2012/0215871 A1 * | 8/2012 | Zhang | G06Q 30/0269 709/206 |
| 2013/0031034 A1 | 1/2013 | Gubin et al. | |
| 2013/0073632 A1 | 3/2013 | Fedorov et al. | |
| 2013/0080242 A1 * | 3/2013 | Alhadeff et al. | 705/14.39 |

(Continued)

*Primary Examiner* — Andrey Belousov
*Assistant Examiner* — Haimei Jiang
(74) *Attorney, Agent, or Firm* — Fenwick & West LLP (57) ABSTRACT

A sponsored interface of a social networking system includes links to different items accessible in the system, arranged by category. Each of the items is associated with a category from a plurality of categories. The social networking system may enable advertisers to boost the ranking of an item in the interface per user, such as a bookmark in a menu of bookmarks, a notification in a menu of notifications, and/or a message in a menu of messages, based on a fee arrangement. The items in the interface are then ranked based on expected fee maximization, taking into account an expected click-through rate.

27 Claims, 4 Drawing Sheets

(56) References Cited

U.S. PATENT DOCUMENTS

| | | | |
|---|---|---|---|
| 2013/0091013 A1* | 4/2013 | Wang | G06Q 30/0241 |
| | | | 705/14.53 |
| 2013/0031489 A1 | 7/2013 | Gubin et al. | |
| 2013/0218961 A1* | 8/2013 | Ho | G06Q 30/02 |
| | | | 709/204 |
| 2014/0136541 A1* | 5/2014 | Farahat et al. | 707/740 |

* cited by examiner

SPONSORED INTERFACES IN A SOCIAL NETWORKING SYSTEM

BACKGROUND

This invention relates generally to social networking, and in particular to providing sponsored interfaces in a social networking system.

A conventional online system may provide various interfaces for users to interact with content on the system, such as bookmarks, notifications, and messaging systems. Bookmarks provide convenient access to pages, applications, and groups in an online system. Without a bookmark, a user may have to navigate though a menu structure or through multiple pages to reach a page, application or group.

The same interface, such as a static ordering of bookmarks, is usually displayed to all of the users. However, this static approach is not ideal for pages, applications, and groups struggling to engage and retain users. In systems where interfaces are not static, users are typically required to set up and manage their own preferences, such as the static ordering of bookmarks they prefer to see. Meanwhile, pages, applications, and groups on the social networking system have no options to influence users to engage with the pages, applications, and groups. Accordingly, there is a need for better mechanisms for providing interfaces for applications on the social networking system.

SUMMARY

An interface of a social networking system includes links to different items accessible in the system, arranged by category. Each of the items is associated with a category from a plurality of categories. The social networking system may enable advertisers to boost the ranking of an item in the interface per user, such as a bookmark in a menu of bookmarks, a notification in a menu of notifications, and/or a message in a menu of messages, based on a fee arrangement. The items in the interface are then ranked based on expected fee maximization, taking into account an expected click-through rate.

The figures depict various embodiments of the described methods and system and are for purposes of illustration only. One skilled in the art will readily recognize from the following discussion that alternative embodiments of the methods and systems illustrated herein may be employed without departing from the principles of the methods and systems described herein.

DETAILED DESCRIPTION

Overview

A social networking system offers its users the ability to communicate and interact with other users of the social networking system. Users join the social networking system and add connections to a number of other users to whom they desire to be connected. Users of social networking system can provide information describing them which is stored as user profiles. For example, users can provide their age, gender, geographical location, education history, employment history and the like. The information provided by users may be used by the social networking system to direct information to the user. For example, the social networking system may recommend social groups, events, and potential friends to a user.

In addition to declarative information provided by users, social networking systems may also record users' actions on the social networking system. These actions include communications with other users, sharing photos, interactions with applications that operate on the social networking system, such as a social gaming application, responding to a poll, adding an interest, and joining an employee network. A social networking system may also be able to capture external website data that is accessed by its users. This external website data may include websites that are frequently visited, links that are selected, and other browsing data. Information about users, such as stronger interests in particular users and applications than others based on their behavior, can be generated from these recorded actions through analysis and machine learning by the social networking system.

A social networking system may also attempt to infer information about its users. A social networking system may analyze posted content by users that include keywords, such as "wedding." Location information may be gathered from content items posted by users to infer a home location of the user. As a result, a social networking system may infer certain profile attributes of a user, such as geographic location, educational institutions attended, and age range, by analyzing the user's connections and their declared profile information. Inferring profile attributes are further discussed in "Inferring User Profile Information," U.S. application Ser. No. 12/916,322, filed on Oct. 29, 2010, which is hereby incorporated by reference.

A social networking system may also enable users to explicitly express interest in a concept, such as celebrities, hobbies, sports teams, books, music, and the like. These interests may be used in a myriad of ways, including targeting advertisements and personalizing the user experience on the social networking system by showing relevant stories about other users of the social networking system based on shared interests. In one embodiment, a social networking system may compute affinity scores for users' interests either explicitly expressed or otherwise inferred on the social networking system and use these affinity scores in ranking new content items that will be published in news feeds, or communication channels on the social networking system, for the users. News feed rankings based on affinity scores are further discussed in related applications, "Adaptive Ranking of News Feed in Social Networks," U.S. application Ser. No. 13/194,770, filed on Jul. 29, 2011 and "Ranking Newsfeed Based on Social Graph Information," U.S. application Ser. No. 13/194,773, filed on Jul. 29, 2011, both which are hereby incorporated by reference.

A social graph includes nodes connected by edges that are stored on a social networking system. Nodes include users and objects of the social networking system, such as web pages embodying concepts and entities, and edges connect the nodes. Edges represent a particular interaction between two nodes, such as when a user expresses an interest in a news article shared by another user about "America's Cup." The social graph may record interactions between users of the social networking system as well as interactions between users and objects of the social networking system by storing information in the nodes and edges that represent these interactions. Custom graph object types and graph action types may be defined by third-party developers as well as administrators of the social networking system to define attributes of the graph objects and graph actions. For example, a graph object for a movie may have several defined object properties, such as a title, actors, directors, producers, year, and the like. A graph action type, such as "purchase," may be used by a third-party developer on a website external to the social networking system to report custom actions performed by users of the social networking system. In this way, the social graph may be "open," enabling third-party developers to create and use the custom graph objects and actions on external websites.

Third-party developers may enable users of the social networking system to express interest in web pages hosted on websites external to the social networking system. These web pages may be represented as page objects in the social networking system as a result of embedding a widget, a social plug-in, programmable logic or code snippet into the web pages, such as an iFrame. Any concept that can be embodied in a web page may become a node in the social graph on the social networking system in this manner. As a result, users may interact with many objects external to the social networking system that are relevant to a keyword or keyword phrase, such as "Justin Bieber." Each of the interactions with an object may be recorded by the social networking system as an edge. By enabling advertisers to target their advertisements based on user interactions with objects related to a keyword, the advertisements may reach a more receptive audience because the users have already performed an action that is related to the advertisement. For example, a merchandiser that sells Justin Bieber t-shirts, hats, and accessories may target ads for new merchandise to users that have recently performed one of multiple different types of actions, such as listening to Justin Bieber's song "Baby," purchasing Justin Bieber's new fragrance, "Someday," commenting on a fan page for Justin Bieber, and attending an event on a social networking system for the launch of a new Justin Bieber concert tour. Enabling third-party developers to define custom object types and custom action types is further described in a related application, "Structured Objects and Actions on a Social Networking System," U.S. application Ser. No. 13/239,340 filed on Sep. 21, 2011, which is hereby incorporated by reference.

Even though a social networking system may collect, and in some cases infer, information about its users, significant resources must be expended to organize the staggering amounts of data collected. A social networking system having hundreds of millions of users, for example, gathers and infers a staggering amount of information about its users. To address issues of scalability and efficiently expending computing resources, a social networking system provides a snapshot of databases for modules to process. Recent changes in a user's personal life, such as an engagement, birth of a child, moving across the country, graduating from college, and starting a new job, can be collected and inferred from these snapshots on social networking systems. Content items related to these life events may be prioritized in a ranking of news feed stories selectively provided to users to ensure that the most relevant information is consumed first, in one embodiment.

As users accumulate more connections on a social networking system, interfaces for indicating new user interactions with content items and/or nodes on the social networking system, such as new posts, comments on posts, expressions of interest on posts, addition of members to user-created groups, messages from other users, notifications about user interactions and the like, have the potential to become inundated and clogged with irrelevant information. Ranking these indications of new user interactions with content items according to users' interests and affinities for other users may help to mitigate this problem. However, applications, groups, and pages in a social networking system may be unable to drive users to engage with the applications, groups, and pages in the social networking system through a ranking based on affinities and interests. Often times, a user may load a web page on the social networking system and inadvertently overlook these indications of new user interactions with content items. This leads to less user engagement on the social networking system.

Social networking systems strive to keep their users engaged with pages, applications, and groups by delivering indications of relevant content to users quickly and efficiently. Advertisers may desire to sponsor one or more indications of relevant content on a per user basis by bidding on positions in an interface for providing the indications of new user interactions with content items on the social networking system. Machine learning and heuristics analysis may be used in selectively providing indications of new content to users of a social networking system, where the indications are provided based at least in part upon sponsored bids and user feedback regarding sponsored indications of new content in interfaces.

Overview of Providing Sponsored Interfaces

Figure 1:
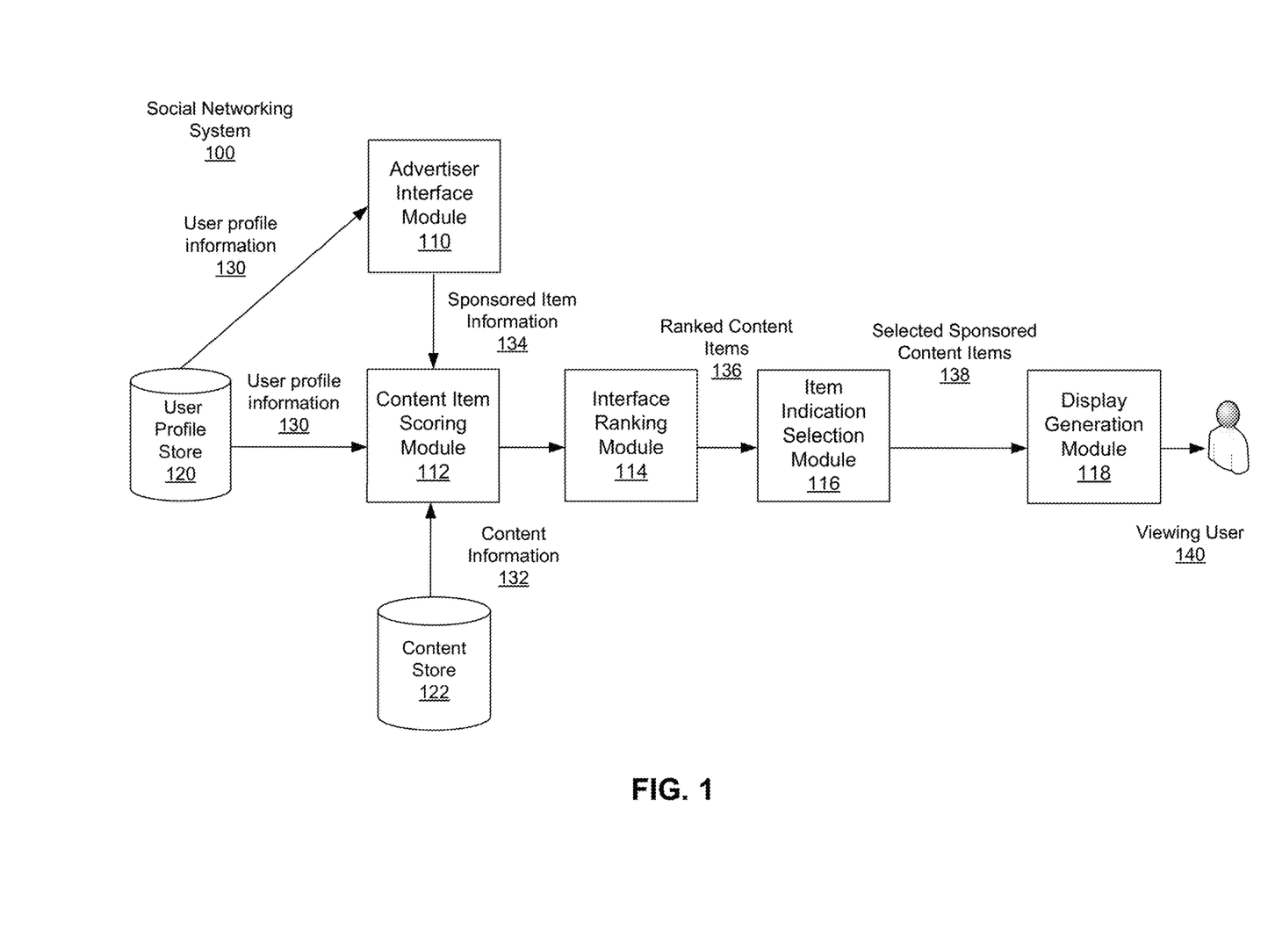
FIG. 1 is a high level block diagram illustrating a system environment suitable for providing sponsored interfaces in a social networking system, in accordance with one embodiment of the invention.

FIG. 1 is a diagram of a social networking system 100 for providing sponsored interfaces for content items in the social networking system 100. Sponsored interfaces provide an effective tool for navigating a website or social networking system that enables advertisers to bid for users' attention. As illustrated in FIG. 1, the user profile store 120 provides user profile information 130 to the content item scoring module 112 and the content store 122 provides content information 132 to the content item scoring module 112. An advertiser interface module 110 provides sponsored item information 134 to the content item scoring module 112. The content item scoring module 112 scores content items based on the received user profile information 130, sponsored item information 134, and the content information 132.

Links to the items may provide a viewing user access to interactive features of the social networking system, either provided directly by the social networking system 100 or available via that system. For example, the content items may include links to pages, groups, friend lists or friend profiles, a newsfeed, a messaging system, and applications. The applications may include, for example, a photo album application, a messaging application, an event planning application, an application offering deals, a marketplace application, a blogging application, an application for managing friend lists, a survey application, a gaming application, or any other application that can be accessed via the social networking system interface, including third-party developed applications.

Sponsored item information 134 may identify one or more entities, such as pages, groups, and applications, which have interactions that may be highlighted, promoted, or otherwise boosted in a ranking order of display in a user interface for a particular viewing user of the social networking system 100. The sponsored item information 134 may vary among different users of the social networking system 100 based on the user profile information 130 received about the users. For example, an advertiser wishing to promote a running application dedicated to tracking running workouts and paths may identify users of the running application that, based on clicking behavior, have usage rates of the running application above an average threshold usage rate across all users. In another embodiment, an advertiser may wish to engage users that have not used the running application as frequently but are connected to other users in the social networking system 100 that have frequent user interactions with the running application. In this way, the advertiser may drive user engagement and user retention. In a further embodiment, advertisers may use sponsored item information 134 to drive user acquisition by presenting a sponsored item linked to the running application in an interface, such as a listing of bookmarks, a listing of notifications, a listing of messages, and/or a listing of indicators of user interactions, to a viewing user that has not installed the application.

Sponsored item information 134 and user profile information 130 are used by the content information scoring module 112 to generate a ranking score for an indicator of content information 132 to be provided for display to a viewing user. A scoring model may include a plurality of weighted scoring factors for determining an expected click-through rate, in one embodiment. As a result, a higher score indicates that the viewing user may be more likely to click on an advertisement based on the user profile information 130 captured by the social networking system 100. In another embodiment, the scoring model may include a plurality of weighted scoring factors for maximizing an expected value of an impression or a click-through. In this way, a higher score may indicate the value of an impression or a click-through for the viewing user. In a further embodiment, a content item score may be generated by a scoring model that incorporates factors for maximizing an expected value of an impression or a click-through as well as factors for determining an expected click-through rate.

An interface ranking module 114 determines one or more rankings of content items based on content item scores generated by the content item scoring module 112. In some embodiments, the interface ranking module 114 determines the highest ranked item from each category and generates a set of ranked content items 136 based on the highest ranked item from each category. The item indication selection module 116 generates a set of selected sponsored content items 138. The set of selected sponsored content items is grouped by category and the categories are ordered based on the set of ranked content items 136. The links in each category are ordered in accordance with the relative ranking of the items corresponding to the links. As used herein, a "sponsored content item" may refer to a link or reference that provides a user with access to an interactive feature available via a social networking system. The set of selected sponsored content items 138 is provided to the display generation module 118 for displaying to the user.

For each user, the user profile store 120 stores user account information, profile information, friendship or connection information, user activity information, usage statistics, user group information, friend list information, associated application information, favorite bookmark information, associated page information, item scoring information, and other user-related data. The profile information for the user may include the user's age, work experience, gender, educational history, interests, geographic location, marital status, household size, political party, and the like. User information 130 may comprise any information available about a user in the user profile store 120.

User group information includes a list of groups that a user belongs to. A group is an area where users can share and collaborate on a topic or idea. For example, a user may belong to a group about sports where users exchange opinions about sports. The associated application information includes a list of applications that a user's account is associated with. The applications may include the applications discussed above. The associated page information includes a list of pages that a user is associated with. In some embodiments, the pages are fan pages for a corporation, product, or public figure. Pages are organized by topic or entity and allow public figures and organizations to broadcast messages to their fans. Favorite bookmark information includes a list of items that a user frequently uses. Friend list information includes friend lists created by a user. A user may create lists of friends in order to make it easier to send messages to certain users, to filter content such as news stories and to control which users can view the user's information and posted content. In some embodiments, the information for a user includes notification numbers for items the user interacts with. For example, a notification number may indicate that there are a number of requests for a gaming application or that there are a number of event requests for a user.

User activity information includes information about a user's actions or interactions. The activity information may include a time stamp of when the interaction occurred, a target identifier for the item that the interaction was directed, the interaction type, and a duration of the activity. The interaction type may be specific to an item. For example, the type of interactions for an event planning application may include viewing an event, creating an event, responding to an event invitation, and posting content to a page associated with an event. The duration of an activity measures the amount of time a user spends interacting with an item. For example, the duration may measure the amount of time a user played a game. In some embodiments, the user activity information includes times and dates a user logs onto the social networking system 100.

The activity information may include usage statistics for a user's interactions. The usage statistics may include the number of times a user has selected a link corresponding to an application, a group, a bookmark, a friend list, or a page. The usage statistics may further include the amount of money a user spent in association with an item such as a game or application. For example, a user may have purchased virtual goods in a game. The usage statistics may include information identifying the time period in which the activities corresponding to the usage statistics took place. For example, the usage statistics may store the number of times a user has selected a link in a 30 day period. In some embodiments, the usage statistics include the number of times a user logs onto the social networking system in a predefined period of time or a system interaction rate. For example, a user may logon once a day or once a week.

Based on the user profile information 130 of a viewing user 140, sponsored item information 134 may be generated by an advertiser interface module 110. The advertiser interface module 110 may receive targeting criteria for advertisements to be provided to users on the social networking system 100 as well as on systems external to the social networking system 100. The targeting criteria may then be used to specify one or more entities that may be included in the sponsored item information 134, such as identifying information of pages, groups, and applications that have paid the social networking system 100 a fee to boost indications of user interactions that have been generated by the pages, groups, and applications in an ordered display of all indications, both sponsored and unsponsored. As a result, the social networking system 100 may bias the sponsored indicators against the unsponsored indicators by promoting or otherwise highlighting the sponsored indicators in the user interface. In one embodiment, the user interface may provide a different ranking of indications of user interactions each time a viewing user 140 views a page on the social networking system 100 based on the sponsored item information 134 generated by the advertiser interface module 110 and the new user interactions included in the content information 132. In another embodiment, the sponsored indicators may have rankings that include a time decay factor such that the most recent relevant sponsored indicators have higher rankings that decrease over time.

The content store 122 stores item information. The item information for an item may identify one or more categories associated with the item. In some embodiments, the categories include pages, groups, applications, and favorite bookmarks. In some embodiments, the item information for an item includes usage statistics for the item. The usage statistics may be determined from groups of users including connections of a particular user, users that share a profile characteristic with a particular user, or all users. The usage statistics for the item may include the average amount of time a user spends interacting with the item, the average amount of money a user spends on the item and the average number of clicks over a period of time for the item. In some embodiments, the item information for an item includes one or more popularity scores for the item. The one or more popularity scores may correspond to the different groups of users discussed above. In some embodiments, the content store 122 stores an icon for each item, where the icon represents a respective item. For example, an icon for a gaming application may include a picture of an object in the game.

The display generation module 118 may receive the selected sponsored content items 138 for generating indicators, or icons, of the selected sponsored content items 138 in a user interface, in one embodiment. For example, an advertiser may wish to sponsor user interactions with a music streaming application, such as Spotify, where the user interactions indicate that one or more of the connections of a viewing user 140 on the social networking system 100 have listened to or is currently listening to a song or album by Britney Spears. Because of the time-sensitive nature of the "is currently listening" graph action, the advertiser may pay a higher premium for sponsoring the indication in the user interface. Advertisers may bid, in one embodiment, on one or more ordered slots in a user interface displayed by the display generation module 118. The first slot may have a higher starting bid than the second slot, and the second slot may have a higher starting bid than a third slot, and so forth. In one embodiment, the first slot in a user interface is associated with the highest bidder. In another embodiment, slots in the user interface may be grouped by category, such as pages, groups, and applications, and then ordered by highest bidder. In a further embodiment, a user may "X-out" or otherwise provide negative feedback to a sponsored indication in the user interface. This negative feedback may be used in by one or more scoring models to negatively discount or negatively affect the content item score generated for the sponsored indication and/or entity associated with the negative feedback.

These embodiments describing providing selected sponsored content items in a social networking system are merely meant to be exemplary and are not intended to be restrictive. In other embodiments, there are more or fewer components performing the same or substantially similar functions as the components of the embodiment of FIG. 1. For instance, the user profile store 120 and the content store 122 may all comprise the same storage entity. In addition, as will be discussed below, in some embodiments, the functionality of the content item scoring module 112, the interface ranking module 114 and display generation module 118 module may be provided by the social networking system. In other embodiments, all or part of this functionality may be provided external to the social networking system.

System Overview

Figure 2:
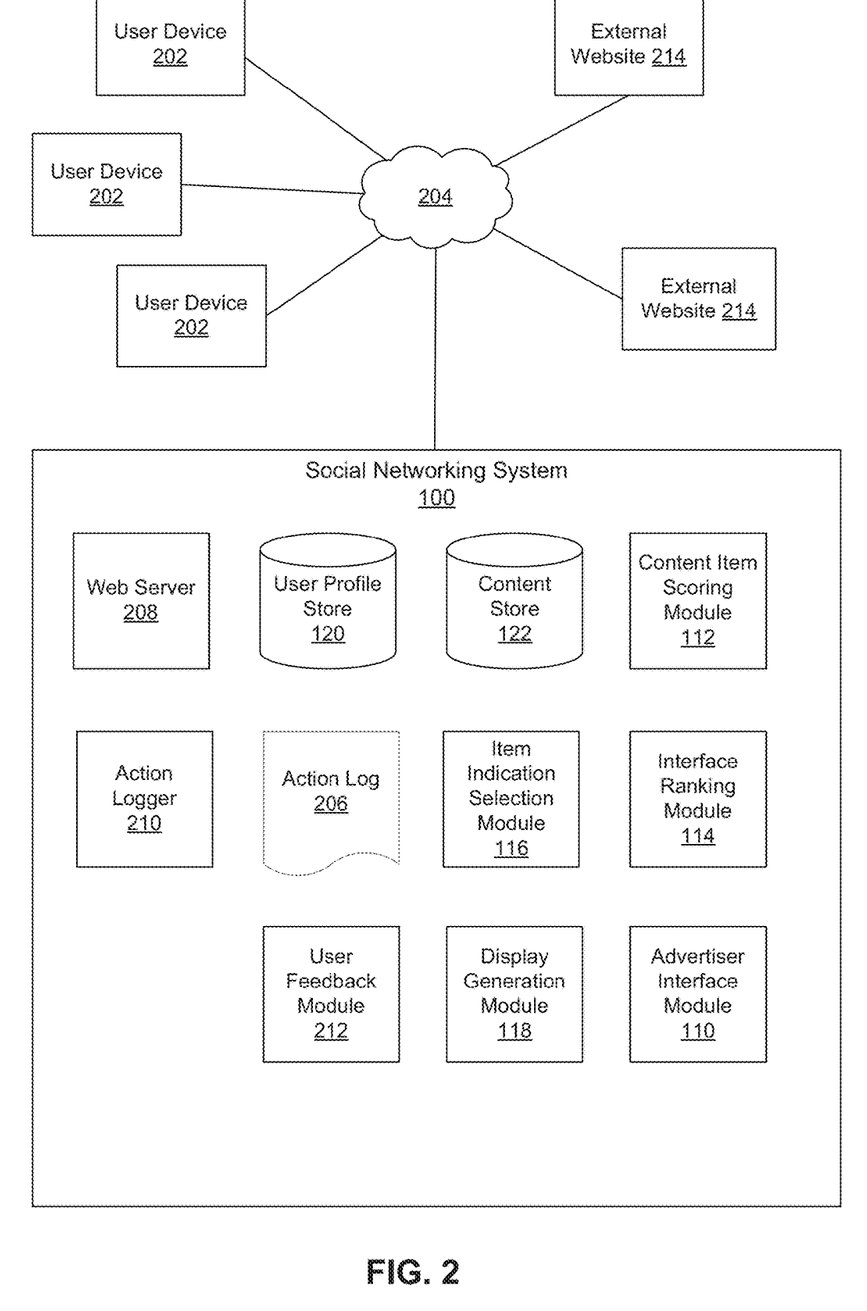
FIG. 2 is a high level block diagram illustrating a system environment suitable for providing sponsored interfaces in a social networking system, in accordance with one embodiment of the invention.

FIG. 2 is a high level block diagram of a distributed system 200 according to one embodiment of the invention. The system 200 includes one or more clients 202, external websites 214, and a social networking system 100 connected by a network 204. In some embodiments, the social networking system 100 is implemented as a single server, while in other embodiments it is implemented as a distributed system of multiple servers. For convenience of explanation, the social networking system 100 is described below as being implemented on a single server system, but the social networking system 100 may be implemented on a plurality of server computers. In some embodiments, system 200 is a social networking system.

The communication network(s) 204 can be any wired or wireless local area network (LAN) and/or wide area network (WAN), such as an intranet, an extranet, or the Internet. It is sufficient that the communication network 204 provides communication capability between the client devices 202 and the social networking system 100. In some embodiments, the communication network 204 uses the HyperText Transport Protocol (HTTP) and the Transmission Control Protocol/Internet Protocol (TCP/IP) to transmit information between devices or systems. HTTP permits client device 202 to access various resources available via the communication network 204. The various embodiments of the invention, however, are not limited to the use of any particular protocol.

A user interacts with the social networking system 100 using a client device 202, which may be any suitable computer device that is capable of connecting to the social networking system 100 via communication network 204, such as a computer, a desktop computer, a laptop computer, a tablet device, a netbook, an internet kiosk, a personal digital assistants, a mobile phone and a gaming device. The client device 202 may communicate with the social networking system 100 via an application 228 such as a web browser or native application. Typical interactions between the client device 202 and the social networking system 100 include operations such as viewing profiles of other users of the social networking system 100, sending messages to other users, contributing and interacting with media items, joining groups, listing and confirming attendance at events, checking in at locations, liking certain pages, creating pages, and performing other tasks that facilitate social interaction.

The social networking system 100 includes an advertiser interface module 110, a content item scoring module 112, an interface ranking module 114, an item indication selection module 116, a display generation module 118, a user profile store 120, a content store 122, an action log 206, a web server 208, an action logger 210, and a user feedback module 212. In other embodiments, the social networking system 100 may include additional, fewer, or different modules for various applications. Conventional components such as network interfaces, security functions, load balancers, failover servers, management and network operations consoles, and the like are not shown so as to not obscure the details of the system.

The web server 208 links the social networking system 100 via the network 204 to one or more user devices 202, and the web server 208 serves web pages, as well as other web-related content, such as Java, Flash, XML, and so forth. The web server 208 may provide the functionality of receiving and routing messages between the social networking system 100 and the user devices 202, for example, instant messages, queued messages (e.g., email), text and SMS (short message service) messages, or messages sent using any other suitable messaging technique. The user can send a request to the web server 208 to upload information, for example, images or videos that are stored in the content store 122. Additionally, the web server 208 may provide API functionality to send data directly to native user device operating systems, such as iOS, ANDROID, webOS, and RIM.

The action logger 210 is capable of receiving communications from the web server 208 about user actions on and/or off the social networking system 100. The action logger 210 populates an action log 206 with information about user actions to track them. Such actions may include, for example, adding a connection to the other user, sending a message to the other user, uploading an image, reading a message from the other user, viewing content associated with the other user, attending an event posted by another user, among others. In addition, a number of actions described in connection with other objects are directed at particular users, so these actions are associated with those users as well.

An action log 206 may be used by a social networking system 100 to track users' actions on the social networking system 100 as well as external websites that communication information back to the social networking system 100. Users may interact with various objects on the social networking system 100, including commenting on posts, sharing links, and checking-in to physical locations via a mobile device. The action log 206 may also include user actions on external websites. For example, an e-commerce website that primarily sells luxury shoes at bargain prices may recognize a user of a social networking system 100 through social plug-ins that enable the e-commerce website to identify the user of the social networking system. Because users of the social networking system 100 are uniquely identifiable, e-commerce websites, such as this luxury shoe reseller, may use the information about these users as they visit their websites. The action log 206 records data about these users, including viewing histories, advertisements that were clicked on, purchasing activity, and buying patterns.

User account information and other related information for users are stored as user profile objects 108 in the user profile store 120. The user profile information stored in user profile store 120 describes the users of the social networking system 100, including biographic, demographic, and other types of descriptive information, such as work experience, educational history, gender, hobbies or preferences, location, and the like. The user profile may also store other information provided by the user, for example, images or videos. In certain embodiments, images of users may be tagged with identification information of users of the social networking system 100 displayed in an image. The user profile store 120 also maintains references to the actions stored in an action log and performed on objects in the content store 122.

An advertiser interface module 110 receives from an advertiser one or more selections of pages, groups, and/or applications for promoting indications of user interactions to a viewing user of the social networking system 100. An advertiser may include any entity or user of the social networking system 100 that promotes a product or service on the social networking system 100. As a result, one or more pages, groups, and/or applications may be biased against the other pages, groups, and applications that are connected to the viewing user in a user interface. The advertiser interface module 110 provides the one or more selections of pages, groups, and/or applications as sponsored item information 134 to the content item scoring module 112 in order to influence scores for indications of user interactions with content items stored in the content store 122.

The content item scoring module 112 scores items based on user activity, sponsored item information received from the advertiser module 110, and user profile information received from the user profile store 120. The scoring module 112 identifies a viewing user and determines scores for items that may be of interest to the viewing user that have occurred since the last time the viewing user accessed the category of items. A user's score for an item or item score is determined based in part on the user's interactions with the item or a bookmark link for the item. If the viewing user regularly interacts with a particular application, such as a gaming application for online poker, new user activity occurring within the gaming application may be more relevant and be of more interest to the viewing user than other user activity occurring in different applications, pages, and/or groups. However, an advertiser that is promoting a new gaming application for online chess, for example, may desire to drive engagement with the same viewing user based on the viewing user's engagement with the gaming application for online poker. As a result, the advertiser may, through the advertiser interface module 110, select the gaming application for online chess to be sponsored such that an icon for the chess game is promoted in rank to be in the same area or above an icon for the poker game, in one embodiment. In another embodiment, the chess game may be boosted a determined number of rankings based on the fee paid to boost the chess game in the display. In a further embodiment, the chess game may be otherwise highlighted or promoted by the display generation module 118, such as adding animation, color highlighting, and/or varying the size of the icon for display to the viewing user based on the determined score of the item.

The content item scoring module 112 retrieves information about the user from the user profile store 120 and information about items from the content store 122 in order to generate the user's item scores. The score for an item may include contributions from multiple factors, such as one or more affinity scores of the viewing user and/or connected users for the one or more categories of the item, a predetermined time period during which the item's ranking may not change within the user interface, qualitative actions taken with respect to the item, a time decay factor that discounts the score over time, amount of money spent in association with the item, and a default score for the item corresponding to the average item score for all items. Sponsored item information 134 received from the advertiser interface module 110 may also be included as a factor for the score of an item, and may be weighted according to a fee paid for the sponsorship, or the bid paid for the particular slot in the interface, in one embodiment. In another embodiment, the weight accorded to sponsored item information 134 may be predetermined. In a further embodiment, the weight for the sponsored item information 134 may be updated based on user feedback received about the ranking of the sponsored item as well as machine learning and regression analysis used to optimize the rankings of sponsored items for maximizing the value of the sponsored item.

An interface ranking module 114 ranks the scored items and produces a list of ranked items. The list of ranked items may be stored as a content item in the content store 122, in one embodiment. The list of ranked items includes information identifying the items, scores for the items, and category information for each item. The category information for an item identifies one or more categories to which the item belongs. The interface ranking module 114 may also rank categories of items. Categories of items may include pages, groups, favorite links, and applications. In some embodiments, the categories include user-defined categories. The interface ranking module 114 determines a ranking of categories according to the ranked items based on scores determined by the content item scoring module 112. In one embodiment, sponsored item information 134 may affect the ranking of an information item, or indicator of user activity that is being sponsored by an advertiser through the advertiser interface module 110, such that the information item appears in a listing that is outside of, or separate from, the ranked categories of items in a user interface on the social networking system 100.

An item indication selection module 116 generates a list of sponsored item indicators, such as bookmarks, notifications, or message alerts, in a user interface on the social networking system 100. In some embodiments, the item indication selection module 116 periodically generates a list of sponsored item indicators for a viewing user 140 based on received sponsored item information 134 received from advertisers. For example, the list may be generated once a day, once a week, once a month, or after a certain time period elapses, such as every ninety minutes. In some embodiments, the list of personalized sponsored item indicators is generated for a viewing user in response to the viewing user operating a web browser that requests a web page in the social networking system 100. The requested page may be a home page, a photo album, a message page, an application page, a profile page, or any other user interface of the social networking system for which the list of indicators may be useful to aid the user in navigating the system.

In order to generate the list of personalized sponsored item indicators, the item indication selection module 116 retrieves a list of ranked items from a content store 122 or from the interface ranking module 114. For each category in the list of ranked categories, the item indication selection module 116 selects a number of items corresponding to the category based on the ranking of the items. For example, the item indication selection module 116 may select the five highest ranked groups, pages, friend lists and applications. In some embodiments, the items with a score or ranking above a predetermined threshold are selected. Links are generated for the selected items, grouped by categories and provided to the display generation module 118.

The display generation module 118 formats the list of personalized sponsored indicators for display. The list of personalized sponsored indicators may be displayed in various formats, such as a menu of bookmark links that is fixed in particular location on a website for viewing the social networking system 100, a drop down menu of notifications that may be accessed and hidden responsive to a viewing user's clicks, and a messaging system that prioritizes messages delivered to a viewing user of the social networking system 100. The personalized sponsored indicators may also be displayed as a pop-up notification on a native mobile application operating on a mobile device, a user interface that automatically renders new indicators of possibly interesting user activity, an applet operating on a website external to the social networking system 100, and an application operating on an application operating outside of a social networking system 100 such as an advertising network application that overlays on a third-party application operating on a mobile device. As referenced herein, the list of indicators provided for display by the display generation module 118 is referred to as a "menu." The menu displays links grouped by categories where the groups are ordered based on the ranking of the categories, in one embodiment. The group corresponding to the highest ranked category may be positioned first in the menu. In some embodiments, the links within a group are ordered based on scores associated with the items corresponding to the links. In some embodiments, the last link in a group corresponds to the most recently used link of the group.

In another embodiment, the menu may have a predetermined number of open slots that may be filled with personalized sponsored indicators for the viewing user. Advertisers may bid on a per-user basis for a particular spot in the menu for viewing users of the social networking system 100. In a further embodiment, an advertiser may drive a first-use of an application, page, or group by sponsoring an indicator to be displayed in one of the open slots, even where the viewing user has not used the application, page, or group.

In one embodiment, the sponsored indicator for the first-use of an application, page, or group may be generated for a viewing user based on the score generated for the item associated with the sponsored indicator. For example, one or more close friends of the viewing user may be active users of a particular fan page for Stevie Wonder, posting photos, videos, comments, links, and sharing songs by the artist on their own profile pages or timelines. Because the viewing user has a strong affinity for these close friends, connected users on the social networking system 100, the content item scoring module 112 may heavily weight those interactions for display to the viewing user. Additionally, an advertiser for the fan page for Stevie Wonder on the social networking system 100 may target a demographic that includes the viewing user. Because the viewing user has high affinity scores for connected users that also heavily use the fan page for Stevie Wonder, those user interactions may be sponsored by the advertiser such that the sponsored indicator of those user interactions is displayed in one of the open slots in the menu by the display generation module 118. The sponsored indicator may also include the social connection information in the menu, such as "John, Paul, Frank, and 5 of your friends like Stevie Wonder" with an indication of the number of user interactions available for display to the viewing user. As a result, personalized sponsored indicators in user interfaces may help advertisers drive first-uses of pages, applications, and groups on the social networking system 100.

A user may also define a set of links in the menu as their "Favorites." These user-generated links may be rendered after the slots reserved for sponsored indicators in the menu, in one embodiment. In another embodiment, "Favorite" links may be displayed as the first item in each category. In a further embodiment, "Favorite" links may be displayed as the first item only after the viewing user views a sponsored advertisement as determined by the sponsored item information 134.

In some embodiments, the display generation module 118 hides or does not include categories of links associated with items that have scores below a threshold score. The score for a category may correspond to the score of the highest scored item in the category, the average score of the items in the category, or based on the exponential decay of item scores in the category. Similarly, the display generation module 118 may hide categories of links that a user has not interacted with for a threshold amount of time. For example, if a user has not interacted with any items in the application category for a month, the application category of bookmarks is not displayed or included in the menu. An advertiser may sponsor a hidden category to be displayed based on sponsoring one or more indicators of user activity on pages, applications, and/or groups in the social networking system 100. In this way, the advertiser may spark an interest in the viewing user to re-engage with the content associated with the sponsored indicator or start engaging with a page, application, or group that the viewing user has not previously connected with in the social networking system 100.

The display generation module 118, in one embodiment, receives one or more indications of user interactions on the social networking system 100 in real-time and updates the menu of sponsored indicators, along with numerical indications of additional user activity on the social networking system 100 available for viewing by the viewing user 140.

A user feedback module 212 may receive user feedback regarding the menu of sponsored indicators, including a viewing user clicking on a sponsored indicator to view the associated content item in the social networking system 100, such as a page, an application, or a group, as well as an "X-out" user interaction that indicates the viewing user's disinterest or otherwise dislike of a particular sponsored indicator. The "X-out" user interaction may comprise a click on an "X" in a user interface, as well as other actions performed by the user to turn off a notification, hide a message, or remove a link from being displayed in the user interface. The "X-out" user feedback may be used to negatively discount scores for content items generated by the particular entity that was disliked, such as an application, page, or group. In one embodiment, the "X-out" user feedback may generate a discount for the viewing user for all content items generated by the particular entity. In another embodiment, the "X-out" user feedback may be stored in the user profile associated with the viewing user that performed the "X-out" user feedback to further train a machine learning model and/or regression models for optimizing targeting of advertisements to the viewing user.

Sponsored Indicators in User Interfaces

Figure 3:
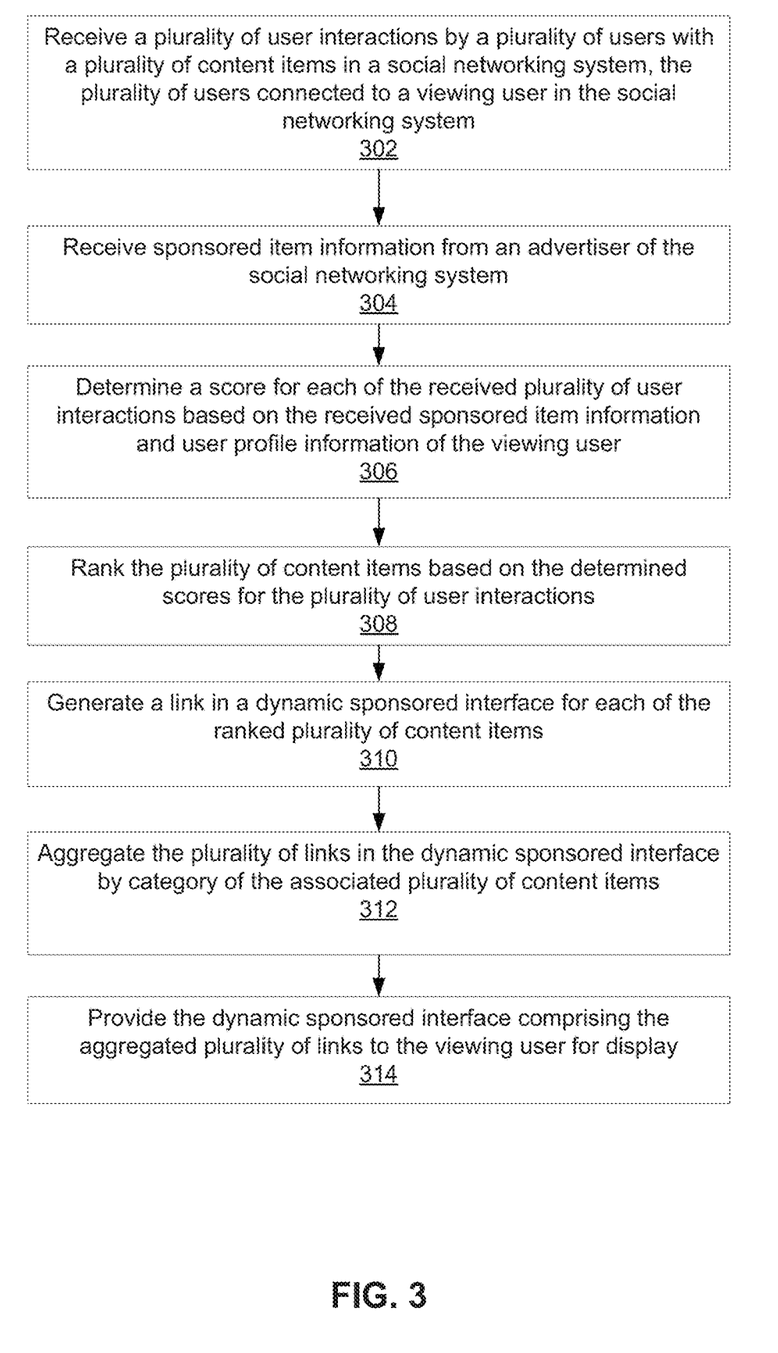
FIG. 3 is a flow chart illustrating a process for providing sponsored interfaces in a social networking system, in accordance with an embodiment of the invention.

FIG. 3 is a flow chart of a process for generating sponsored indicators in user interfaces based on user activity, in accordance with one embodiment of the invention. This process may be performed at a server system (e.g., social networking system 100) having one or more processors and non-transitory memory. The non-transitory memory stores one or more programs to be executed by the one or more processors. The one or more programs include instructions for carrying out the process.

In this process, a plurality of user interactions with a plurality of content items by a plurality of users in a social networking system are received 302, where the plurality of users are connected to a viewing user in the social networking system. Each of the plurality of items is associated with a category from a plurality of categories. In some embodiments, the categories include pages, groups, applications, and favorite links and/or bookmarks. Some of the items may be associated with multiple categories. For example, an online gaming application may be associated with the application category and the favorite bookmarks category.

Sponsored item information is received 304 from an advertiser of the social networking system. The sponsored item information may identify one or more particular entities, such as pages, groups, and/or applications on the social networking system 100 that are being sponsored such that indications of user activity with those particular entities are biased against other indications of user activity. In this way, "sponsored indicators" may be highlighted to a viewing user of the social networking system 100.

A score for each of the received plurality of user interactions is determined 306 based on the received sponsored item information and user profile information of the viewing user. The score may be generated based on factors for maximizing the value of a sponsored indicator, including factors for determining one or more content items that the viewing user may be interested in viewing. The factors for generating the score may also include discounting the score based on negative user feedback received from the viewing user with respect to an entity identified in the sponsored item information received from the advertiser.

After a score is determined 306 for each of the plurality of user interactions with the plurality of content items, the plurality of content items are then ranked 308 based on the determined scores for the plurality of user interactions. The user interactions may include user interactions with the associated content items, links corresponding to the content items, and/or other actions taken in association with the content items, such as comments, shares, likes, mentions, and/or custom graph actions such as "listening" and "playing." In one embodiment, a content item may comprise a category of other content items, such as a plurality of gaming applications published by a particular social gaming publisher. In that example, the category of content items may be games published by that publisher and a score that is determined for the category may be high based on the viewing user's past interactions with other games by the game publisher, user interactions with connected users playing the same games, and so forth.

A link is generated 310 in a sponsored interface for each of the ranked plurality of content items. The generated link provides the viewing user direct access to the corresponding content item in the social networking system 100, such as a hyperlink to a page or a group and/or a shortcut hyperlink to loading a particular application on the website or native application being used to browse the social networking system 100. As mentioned above, the sponsored interface may comprise a menu of a listing of links, such as a notification dropdown menu, a fixed navigation menu of links on a website, and a listing of mailboxes comprising messages in a messaging system. The plurality of links are then aggregated 312 in the sponsored interface by category of the associated plurality of content items. For example, sponsored indicators, such as sponsored bookmarks in a menu, that correspond to the application category may be grouped together, sponsored bookmarks corresponding to pages may be grouped together, and sponsored bookmarks for groups may be grouped together. Other groupings or aggregations may be generated, such as applications that are "favorited" by the viewing user and connected users, applications and pages relevant to a particular topic or interest in the social networking system 100 such as politics, as well as links to new groups that connected users have joined that the viewing user may wish to join. These groupings may be included in the sponsored item information received from an advertiser or may be generated organically by the social networking system 100 identifying trending topics, interests, and categories of content items that may be of interest to the viewing user.

The sponsored interface comprising the aggregated plurality of links is then provided 314 to the viewing user for display. The display generation module 118 may provide 314 the sponsored interface in various formats, including as a navigation menu of bookmark links in a fixed position on a website or native application for browsing the social networking system 100, a dropdown menu of notification links for notifying a viewing user of new user activity in the social networking system 100, a summary of messages in a messaging system on the social networking system 100, an applet for displaying user activity to a viewing user browsing external websites, as well as other applications that may be installed in external systems that provide information to an identifiable viewing user of the social networking system 100.

Figure 4:
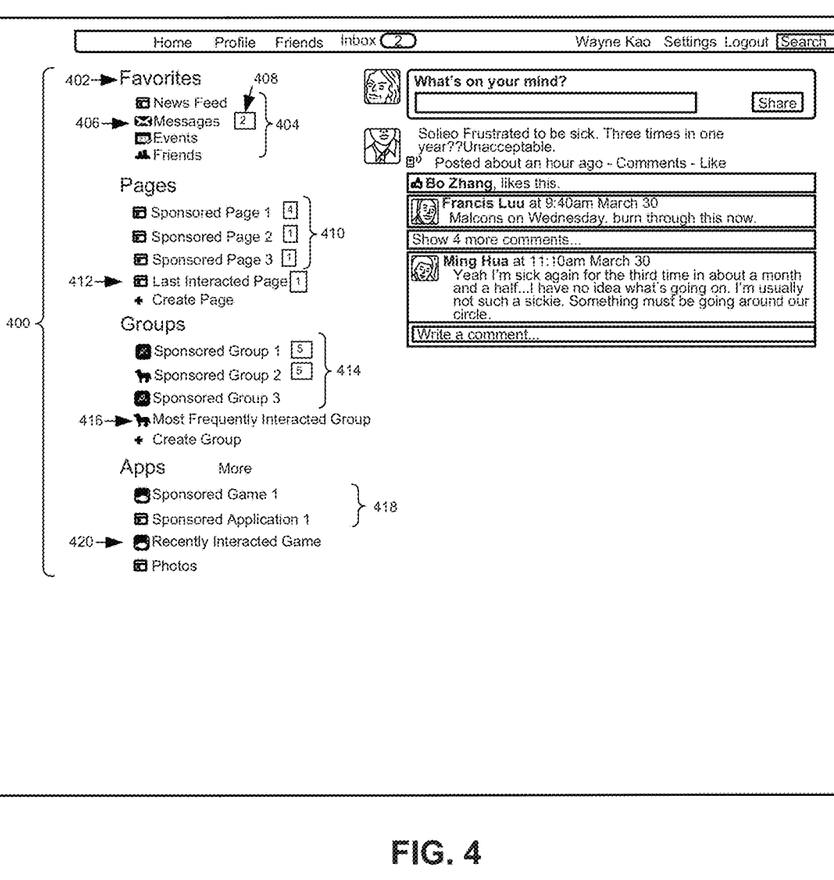
FIG. 4 is a screenshot of a set of sponsored bookmarks in an interface, in accordance with an embodiment of the invention.

FIG. 4 illustrates an example screenshot of a set of sponsored bookmarks in a user interface in a social networking system, in accordance with an embodiment of the invention. The sponsored interface 400 comprises a navigation menu of bookmark links that enable a viewing user to quickly launch applications operating on the social networking system 100, including sponsored bookmarks linking to third-party developed applications alongside bookmarks linking to applications that are developed by administrators of the social networking system 100. A header 402 may be displayed for each category of indicator, such as "Favorites," "Pages," "Groups," and "Apps." Favorite bookmarks 404 may be manually inputted by a viewing user such that the favorite bookmarks 404 remain fixed in the sponsored interface 400. An icon 406 may represent the type of content item represented by the bookmarks, such as an envelope icon for a messaging application on the social networking system 100. A numeric indicator 408 may be displayed in the sponsored interface 400 for a particular icon 406 to indicate the number of user interactions that have been unviewed by the viewing user.

As illustrated in FIG. 4, sponsored indicators for pages 410, sponsored indicators for groups 414, and sponsored indicators 418 for applications may be included in the sponsored interface 400. In one embodiment, the sponsored indicators displayed in the sponsored interface 400 are displayed by ranking based on determined scores taking into account an expected fee maximization. In another embodiment, each slot for each category of sponsored indicators is bid on separately by advertisers on a per-user basis. Although only three slots are illustrated for the sponsored indicators for pages 410 and sponsored indicators for groups 414, more or fewer slots may be provided to the viewing user based on sponsored indicator inventory. Though illustrated as bookmarks in FIG. 4, sponsored indicators may be provided in other formats, such as in a drop down menu of notifications, a messaging interface, a real-time ticker on the social networking system, and other applications operating on the social networking system 100 as well as on external systems connected to the social networking system 100. Interspersed between the sponsored indicators for pages 410, sponsored indicators for groups 414, and sponsored indicators 418 are other indicators, such as an indicator of the last interacted page 412, an indicator of the most frequently interacted group 416, and an indicator for the most recently interacted game 420. Note that placeholders have been used for the names of the pages, groups, and applications as well as the other indicators mentioned above. For example, a first sponsored page may be for "Britney Spears," a second sponsored page may be for "Chopin," and a third sponsored page may be for "Mardi Gras."

Upon clicking or otherwise interacting with one of the sponsored indicators, or bookmarks as illustrated in FIG. 4, the social networking system 100 provides the content item associated with the selected bookmark. Because some sponsored indicators have been provided to drive user growth and first-time usage, the viewing user may be required to join a group, like a page, or authorize an application associated with a selected bookmark before viewing the content item associated with the selected bookmark on the social networking system 100. In one embodiment, a sponsored indicator may provide a link to an external website or external system.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, by a social networking system for a viewing user, sponsored application information comprising one or more bids to sponsor a subset of a plurality of applications operated by the social networking system to boost corresponding links presented on a user interface, each link presented to provide a shortcut to an application of the plurality of applications based on the viewing user having interacted with interactive content of another application operated by in the social networking system, the interactive content being of a same category as at least one of the plurality of applications, wherein each of the plurality of applications, when executed, cause further interactive content to be output to the viewing user;
   determining, for the viewing user, a ranking of the plurality of applications based in part on the sponsored application information, where the subset of the plurality of applications are boosted in the ranking of the plurality of applications over a remainder of the plurality of applications not included in the subset of the plurality of items based on the one or more bids;
   determining an ordering of a plurality of links for the plurality of applications in the user interface based on the determined ranking of the plurality of applications, where the plurality of links comprise one or more sponsored links for the subset of the plurality of items to provide one or more shortcuts to one or more corresponding sponsored applications of the plurality of applications in the social networking system; and
   providing the plurality of links comprising the one or more sponsored links in the user interface for display to the viewing user according to the determined ordering of the plurality of links.

2. The method of claim 1, wherein the ranking of the plurality of applications is further based on a factor for maximizing an expected value of a sponsored application identified in the sponsored item information.

3. The method of claim 1, wherein determining the ranking of the plurality of applications further comprises discounting an application of the plurality of applications based on negative user feedback associated with the item.

4. The method of claim 1, wherein determining the ranking of the plurality of applications is further based on a factor for maximizing an expected click-through rate of a sponsored application identified in the sponsored application information.

5. The method of claim 1, wherein determining the ranking of the plurality of applications is further based the one or more bids included in the received sponsored application information for a plurality of ordered slots in the user interface.

6. The method of claim 1, wherein determining the ranking of the plurality of applications is further based on a plurality of scores for the plurality of applications, where the plurality of scores are based in part on the received sponsored application information.

7. The method of claim 1, wherein determining the ranking of the plurality of applications is further based at least in part on an amount of money the viewing user has spent on goods or services in relation to an application of the plurality of applications.

8. The method of claim 1, wherein determining the ranking of the plurality of applications is further based at least in part on a popularity of the plurality of applications among a group of users.

9. The method of claim 1, wherein determining the ranking of the plurality of applications is further based at least in part on one or more affinity scores associated with the viewing user for the subset of the plurality of applications identified in the sponsored application information.

10. The method of claim 1, wherein the user interface comprises one or more selected from a group consisting of: a drop down menu, a navigation menu, a notification interface, a messaging system interface, and any combination thereof.

11. A method comprising:
    receiving, by a social networking system for a viewing user, sponsored application information comprising one or more bids to sponsor a subset of a plurality of applications to boost corresponding links presented on a user interface, each link providing a shortcut to an application of the plurality of applications based on the viewing user having a connection in the social networking system relating to an interaction with interactive content of another application operated by the social networking system, the interactive content being of a same category as at least one of the plurality of applications, wherein each of the plurality of applications, when executed, cause further interactive content to be output to the viewing user;
    determining a plurality of scores for the plurality of applications based in part on the sponsored application information, where the one or more scores for the subset of the plurality of applications include one or more boosts based on the one or more bids included in the received sponsored application information;
    determining, for the viewing user, a ranking of the plurality of applications based on the plurality of scores for the plurality of applications based on the one or more bids;
    determining an order of the plurality of applications represented by a plurality of links in the user interface comprising the plurality of links to the plurality of applications in the social networking system, where the order is determined based on the ranking of the plurality of applications; and
    providing the user interface for display to a viewing user, where the plurality of links are provided in the user interface according to the determined order of the plurality of applications.

12. The method of claim 11, wherein determining the plurality of scores for the plurality of applications is further based at least in part on user profile information of the viewing user comprising one or more affinity scores for the plurality of applications.

13. The method of claim 11, wherein the viewing user is not connected to a sponsored application in the social networking system, where the sponsored application is identified in the received sponsored application information.

14. The method of claim 11, wherein the user interface comprises a plurality of ordered slots and wherein determining the plurality of scores is further based at least in part on the one or more bids received for the plurality of ordered slots.

15. The method of claim 11, wherein determining the plurality of scores for the plurality of applications further comprises:
generating a scoring model for maximizing an expected value of each application of the plurality of applications based on user profile information about the viewing user; and
determining the plurality of scores for the plurality of applications based on the generated scoring model.

16. The method of claim 11, wherein the sponsored application information identifies one or more entities in the social networking system, and wherein determining the plurality of scores for the plurality of applications further comprises:
generating a scoring model that boosts one or more user interactions with the identified one or more entities in the sponsored application information; and
determining the plurality of scores for the plurality of applications based on the generated scoring model.

17. The method of claim 11, wherein determining a ranking of the plurality of applications is further based on a category of each application of the plurality of applications.

18. The method of claim 14, wherein determining the plurality of scores for the plurality of applications further comprises:
for each item of the plurality of applications,
retrieving a scoring model for the item based on a category of the application; and
determining a score for the application using the retrieved scoring model.

19. A method comprising:
receiving, by a social networking system for a viewing user, a plurality of sponsored application requests from a plurality of advertisers in a social networking system, where the plurality of sponsored application requests include one or more bids to boost a plurality of rankings of a plurality of applications represented as links in one or more user interfaces in the social networking system, each link presented to provide a shortcut to one of the applications;
for a viewing user, selecting a set of sponsored item requests based on a plurality of user interactions, in the social networking system, with interactive content of another application operated by the social networking system, the interactive content being of a same category as a subset of the plurality of applications, wherein each of the plurality of applications, when executed, cause further interactive content to be output to the viewing user;
based on the selected set of sponsored item requests and the plurality of user interactions, determining for the viewing user one or more sponsored applications for display in a particular user interface of the one or more user interfaces in the social networking system for the viewing user, where the one or more sponsored applications correspond to the selected set of sponsored application requests that further include one or more boosted rankings of the subset of the plurality of applications based on the one or more bids; and
providing the particular user interface comprising the determined one or more sponsored applications for display to the viewing user, where the determined one or more sponsored applications are provided for display in the one or more boosted rankings among a plurality of non-sponsored applications in the particular user interface.

20. The method of claim 19, wherein the particular user interface comprises a plurality of ordered slots and wherein determining the one or more sponsored applications is based at least in part on the one or more bids received for the plurality of ordered slots.

21. The method of claim 19, wherein a sponsored application request comprises a particular bid value and wherein determining the one or more sponsored applications is based at least in part on particular bid values based on the one or more bids received by the social networking system.

22. The method of claim 19, wherein selecting a set of sponsored application requests for a viewing user further comprises:
retrieving user profile information for the viewing user; and
selecting one or more sponsored item requests based on the retrieved user profile information.

23. The method of claim 19, wherein selecting a set of sponsored application requests for a viewing user further comprises:
retrieving one or more user interactions performed by the viewing user; and
selecting one or more sponsored item requests based on the one or more retrieved user interactions.

24. The method of claim 19, wherein selecting a set of sponsored application requests for a viewing user further comprises:
retrieving one or more user interactions performed by one or more social connections of the viewing user in the social networking system; and
selecting one or more sponsored item requests based on the one or more retrieved user interactions.

25. The method of claim 1, wherein the plurality of links comprise bookmark links in a menu on the user interface that, when selected, direct the viewing user to bookmarked content in the social networking system associated with the bookmark link.

26. The method of claim 1, wherein providing the plurality of links comprising the one or more sponsored links in the user interface further comprises providing the plurality of links in a plurality of user interface displays to the viewing user, the plurality of links being arranged according to the determined ordering in each of the plurality of user interface displays.

27. The method of claim 1, wherein the ranking of the plurality of applications comprises ranking based on a factors relating to the viewing user that are independent from sponsorship of the applications, and wherein the sponsored items are boosted in the ranking based on the sponsorship.

* * * * *

UNITED STATES PATENT AND TRADEMARK OFFICE
CERTIFICATE OF CORRECTION

PATENT NO. : 10,445,786 B2  
APPLICATION NO. : 13/748521  
DATED : October 15, 2019  
INVENTOR(S) : Amit et al.

Page 1 of 1

It is certified that error appears in the above-identified patent and that said Letters Patent is hereby corrected as shown below:

In the Claims

Column 17, Line 23, In Claim 1, after "by", delete "in"

Signed and Sealed this
First Day of September, 2020

Andrei Iancu
*Director of the United States Patent and Trademark Office*